(12) United States Patent
Jarry

(10) Patent No.: US 11,575,172 B2
(45) Date of Patent: *Feb. 7, 2023

(54) ELECTRONIC DEVICE INCLUDING INTERPOSER SUBSTRATE CARRYING MICA SUBSTRATE WITH BATTERY LAYER ENVIRONMENTALLY SEALED THERETO

(71) Applicant: STMicroelectronics (Tours) SAS, Tours (FR)

(72) Inventor: Vincent Jarry, La Membrolle sur Choisille (FR)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,016

(22) Filed: Jan. 5, 2022

(65) Prior Publication Data

US 2022/0131215 A1    Apr. 28, 2022

Related U.S. Application Data

(62) Division of application No. 16/372,604, filed on Apr. 2, 2019, now Pat. No. 11,251,478, which is a division (Continued)

(51) Int. Cl.
*H01M 50/116* (2021.01)
*H01M 50/124* (2021.01)
(Continued)

(52) U.S. Cl.
CPC .............. *H01M 50/10* (2021.01); *H01M 6/40* (2013.01); *H01M 10/0436* (2013.01);
(Continued)

(58) Field of Classification Search
CPC ...... Y02P 70/50; H01M 10/0436; H01M 6/40; H01M 10/0585; H01M 50/116;
(Continued)

(56) References Cited

U.S. PATENT DOCUMENTS 6,218,045 B1 * 4/2001 Ide .................. H01M 50/133
429/57
6,632,563 B1    10/2003 Krasnov et al.
(Continued)

FOREIGN PATENT DOCUMENTS

CN        205564825 U      9/2016

OTHER PUBLICATIONS

First Office Action and Search Report for family-related CN Appl. No 201610113363.5, report dated Aug. 28, 2018 (9 pages).
(Continued)

*Primary Examiner* — Imran Akram
(74) *Attorney, Agent, or Firm* — Crowe & Dunlevy

(57) ABSTRACT

An electronic device includes a base substrate with a mica substrate thereon. A top face of the mica substrate has a surface area smaller than a surface area of a top face of the base substrate. An active battery layer is on the mica substrate and has a top face with a surface area smaller than a surface area of a top face of the mica substrate. An adhesive layer is over the active battery layer, mica substrate, and base substrate. An aluminum film layer is over the adhesive layer, and an insulating polyethylene terephthalate (PET) layer is over the aluminum film layer. A battery pad is on the mica substrate adjacent the active battery layer, and a conductive via extends to the battery pad. A conductive pad is connected to the conductive via. The adhesive, aluminum film, and PET have a hole defined therein exposing the conductive pad.

14 Claims, 6 Drawing Sheets

Related U.S. Application Data of application No. 14/847,137, filed on Sep. 8, 2015, now Pat. No. 10,290,838.

(51) Int. Cl.

| | | |
|---|---|---|
| *H01M 6/40* | (2006.01) | |
| *H01M 50/10* | (2021.01) | |
| *H01M 10/04* | (2006.01) | |
| *H01M 50/528* | (2021.01) | |
| *H01M 50/543* | (2021.01) | |

(52) U.S. Cl.
CPC ..... *H01M 10/0463* (2013.01); *H01M 50/116* (2021.01); *H01M 50/124* (2021.01); *H01M 50/528* (2021.01); *H01M 50/543* (2021.01); *H01M 2220/30* (2013.01)

(58) Field of Classification Search
CPC .. H01M 50/124; H01M 50/183; H01M 4/139; H01M 50/186; H01M 50/191; Y10T 29/4911
See application file for complete search history.

(56) References Cited

U.S. PATENT DOCUMENTS

| | | |
|---|---|---|
| 2002/0001747 A1 | 1/2002 | Jenson et al. |
| 2005/0260492 A1 | 11/2005 | Tucholski et al. |
| 2007/0139001 A1 | 6/2007 | Hahn |
| 2008/0003493 A1 | 1/2008 | Bates |
| 2008/0032236 A1 | 2/2008 | Wallace et al. |
| 2008/0263855 A1* | 10/2008 | Li .................... H01M 10/0436 29/623.5 |
| 2009/0057136 A1 | 3/2009 | Wang et al. |
| 2009/0136839 A1 | 5/2009 | Kraznov et al. |
| 2010/0330411 A1 | 12/2010 | Nam et al. |
| 2011/0076550 A1* | 3/2011 | Liang ................. H01M 50/193 29/623.2 |
| 2011/0094094 A1 | 4/2011 | Li et al. |
| 2011/0300413 A1 | 12/2011 | Jacobs et al. |
| 2013/0164607 A1 | 6/2013 | Shih et al. |
| 2013/0216904 A1 | 8/2013 | Jarry |
| 2013/0241076 A1 | 9/2013 | Mandlik et al. |
| 2013/0260183 A1 | 10/2013 | Ellis-Monaghan et al. |
| 2013/0260230 A1 | 10/2013 | Liang |
| 2014/0079984 A1 | 3/2014 | Kajitani et al. |
| 2015/0125731 A1 | 5/2015 | Ro et al. |
| 2015/0280201 A1 | 10/2015 | Bhardwaj |
| 2015/0357625 A1 | 12/2015 | Nizou et al. |
| 2016/0049624 A1 | 2/2016 | Bhardwaj et al. |
| 2016/0301037 A1 | 10/2016 | Durand et al. |
| 2016/0343552 A1 | 11/2016 | Sun et al. |
| 2017/0288272 A1 | 10/2017 | Kwak et al. |

OTHER PUBLICATIONS

Second Office Action and Search Report for family-related CN Appl. No 201610113363.5, report dated May 8, 2019 (5 pages).

* cited by examiner

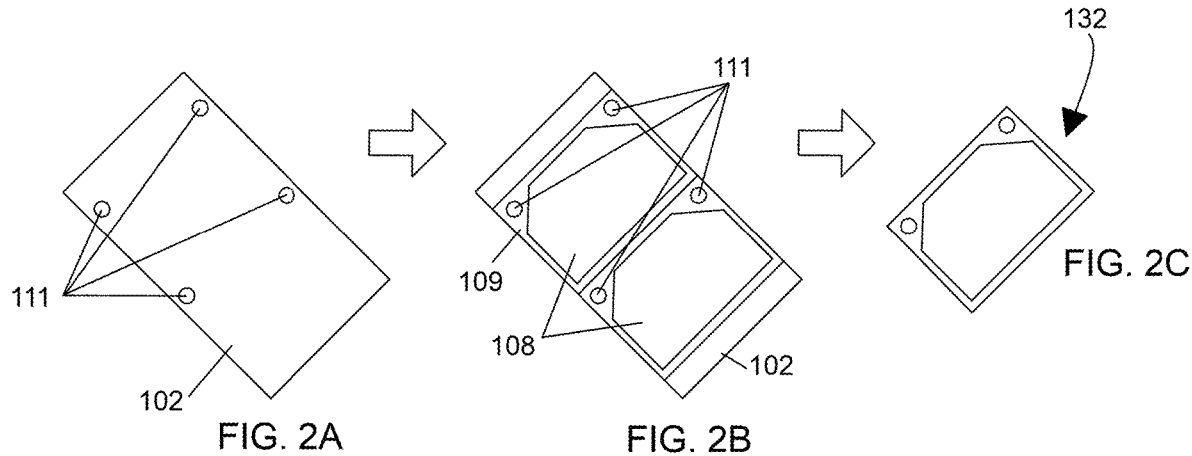
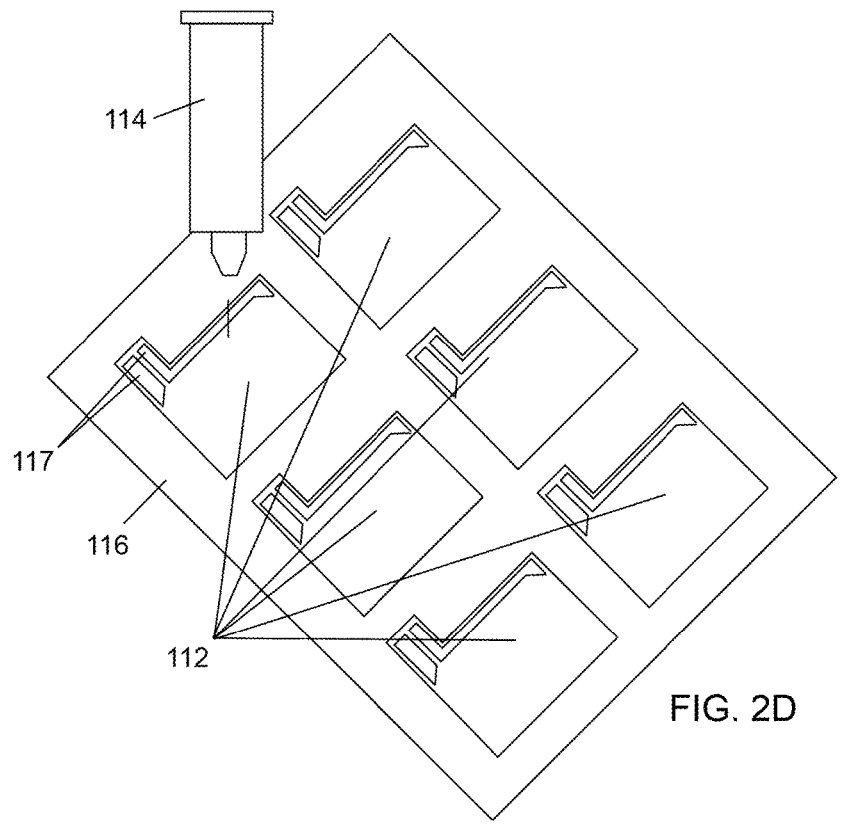
FIG. 2A  FIG. 2B  FIG. 2C
FIG. 2D

ELECTRONIC DEVICE INCLUDING INTERPOSER SUBSTRATE CARRYING MICA SUBSTRATE WITH BATTERY LAYER ENVIRONMENTALLY SEALED THERETO

CROSS-REFERENCE TO RELATED APPLICATIONS

This application is a divisional of U.S. Application for patent Ser. No. 16/372,604, which is a divisional of U.S. Application for patent Ser. No. 14/847,137, filed on Sep. 8, 2015, now U.S. Pat. No. 10,290,838, the contents which are incorporated by reference in their entireties to the fullest extent available under the law.

TECHNICAL FIELD

This disclosure relates to the field of battery technology, and more particularly, to methods for encapsulating flexible thin-film micro-batteries to protect against environmental intrusion.

BACKGROUND

Portable electronic devices such as laptops, smartphones, tablets, and cameras are popular with consumers. These electronic devices are powered by batteries, or power units. Due to the portable nature of these electronic devices, they are repeatedly exposed to environmental contaminants more often than electronic devices such as televisions, for example. This repeated exposure of the electronic device to environmental contaminants brings about a commercial desire for the various internal components, such as the power units, to be protected against such contaminants. Some such power units are flexible thin-film micro-batteries for example.

Such flexible thin-film micro-batteries include, in a stacked arrangement, a mica substrate, an active battery layer on the mica substrate, a polyvinylidene chloride (PVDC) layer coating over the active battery layer, and a mica cover over the PVDC layer. While the PVDC and mica cover provide a degree of protection from environmental contaminants, oxygen and water may over time slowly be able to diffuse through the layers of the stacked arrangement and degrade the active battery layer.

Given that degradation of the active battery layer is commercially undesirable, new designs for power units that are more resistant to environmental contaminants, as well as the processes used to produce such power units, are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an electronic device, including a base substrate and a plurality of mica substrates disposed on the base substrate, each mica substrate having an area smaller than an area of the base substrate. An active battery layer is disposed on each mica substrate, with the active battery layer having an area smaller than the area of that mica substrate. The base substrate has a set of conductive pads for each mica substrate formed thereon. A film seals the active battery layers and mica substrates, with the film being sized in area such that the film extends beyond each active battery layer to contact each mica substrate and the base substrate. The film has a hole defined therein exposing the set of conductive pads for each mica substrate.

Battery pads may be on each mica substrate adjacent the active battery layer for that mica substrate, with each mica substrate having conductive vias formed therein through the battery pad. The sets of conductive pads for each mica substrate may be respectively coupled to the conductive vias for that mica substrate.

Each mica substrate may be rectangular in shape, with each active battery layer being polygonal in shape such that a triangular area is defined on a corner of the associated mica substrate by an absence of the active battery layer. The battery pad for each mica substrate may be within the triangular area for that mica substrate.

The film may have holes defined therein exposing the sets of conductive pads. The film may include, in a stacked arrangement, an adhesive layer, and aluminum film layer, and a PET layer.

Also disclosed herein is an electronic device, including a base substrate, and a plurality of battery substrates constructed from mica and being attached to the base substrate, with an aggregate area of the base substrate being greater than an aggregate area of the plurality of battery substrates. There are also a plurality of active battery layers, each active battery layer being attached to a different respective battery substrate, with each active battery layer having a smaller area than an area of the corresponding battery substrate. A film is disposed over the plurality of active battery layers and sized in area such that the film extends beyond each active battery layer to contact each battery substrate, and such that the film extends beyond each battery substrate to contact the base substrate.

There may be a battery pad on each battery substrate adjacent its respective active battery layer, with each battery substrate having a conductive via formed therein through its respective battery pad. A plurality of conductive pads may be formed on the base substrate, with each conductive pad being electrically coupled to a different one of the conductive vias.

The film may have a plurality of holes defined therein, each hole exposing a different conductive pad. Each battery substrate may be rectangular in shape, with each active battery layer being polygonal in shape such that a triangular area is defined on a corner of its respective mica substrate by an absence of the active battery layer. The battery pad for that battery substrate may be within the triangular area.

Also disclosed herein is an electronic device, including a base substrate and a mica substrate on the base substrate, with a top face of the mica substrate having a surface area smaller than a surface area of a top face of the base substrate. There is an active battery layer on the mica substrate, with a top face of the active battery layer having a surface area smaller than a surface area of a top face of the mica substrate. An adhesive layer is over the active battery layer, mica substrate, and base substrate. An aluminum film layer over the adhesive layer, and an insulating polyethylene terephthalate (PET) layer is over the aluminum film layer.

There may be a battery pad on the mica substrate adjacent the active battery layer, and the mica substrate may have a conductive via formed therein which extends to the battery pad. A conductive pad may be formed on the base substrate and electrically connected to the conductive via. The adhesive layer, aluminum film layer, and PET layer may have a hole defined therein exposing the conductive pad.

The mica substrate may be rectangular in shape. The active battery layer may be polygonal in shape. The mica substrate and battery layer may be shaped such that an area is defined on a corner thereof by an absence of the active battery layer. The adhesive layer, aluminum film layer, and PET layer may environmentally seal the active battery layer.

BRIEF DESCRIPTION OF THE DRAWINGS

FIGS. 2A-2I are perspective views showing the process of manufacturing the electronic device of FIG. 1.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
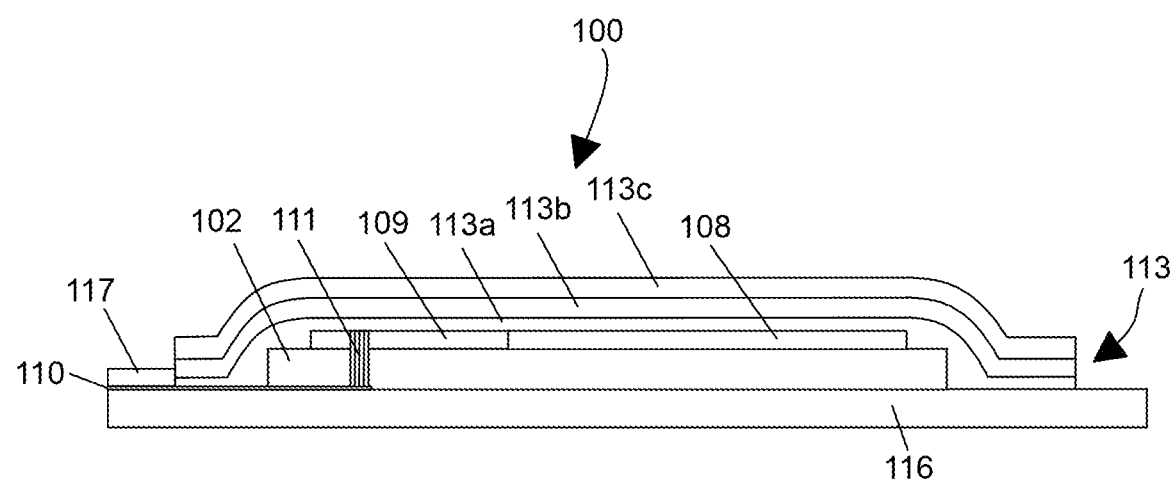
FIG. 1 is a schematic cross sectional diagram of an electronic device in accordance with this disclosure.

With reference to FIG. 1, a power unit (e.g., a battery) 100 is now described. The power unit 100 is for powering a portable electronic device such as a laptop, smartphone, tablet, smartwatch, or camera. Structure of the power unit 100 will now be described.

The power unit 100 includes an interposer (e.g., a base substrate) 116. A mica substrate 102 is disposed on the interposer 116, and the mica substrate 102 has an area smaller than that of the interposer. A conductive via 111 is formed in the mica substrate 102, and is electrically coupled to a contact pad 117 via conductive glue 110. An active battery layer 108 is disposed on the mica substrate 102 and has an area smaller than that of the mica substrate 102. A battery contact pad 109 for the active battery layer 108 is disposed on the mica substrate 102 adjacent the active battery layer 108 and is electrically coupled to the conductive via 111 via conductive glue.

A film 113 covers the active battery layer 108 and battery contact pad 109, spills over onto the mica substrate 102, and spills over onto the interposer 116. The film is comprised of a layer of glue 113a on the active battery layer 108 and battery contact pad 109, an aluminum film 113b on the layer of glue 113a, and an insulating polyethylene terephthalate (PET) layer 113c on the aluminum film 113b. The film 113 serves to environmentally seal against oxygen and moisture intrusion. The spilling of the film 113 over onto the mica substrate 102 and interposer 116 serves to increase the environmental sealing over prior designs that leave the sides of the components exposed.

Figure 2E:
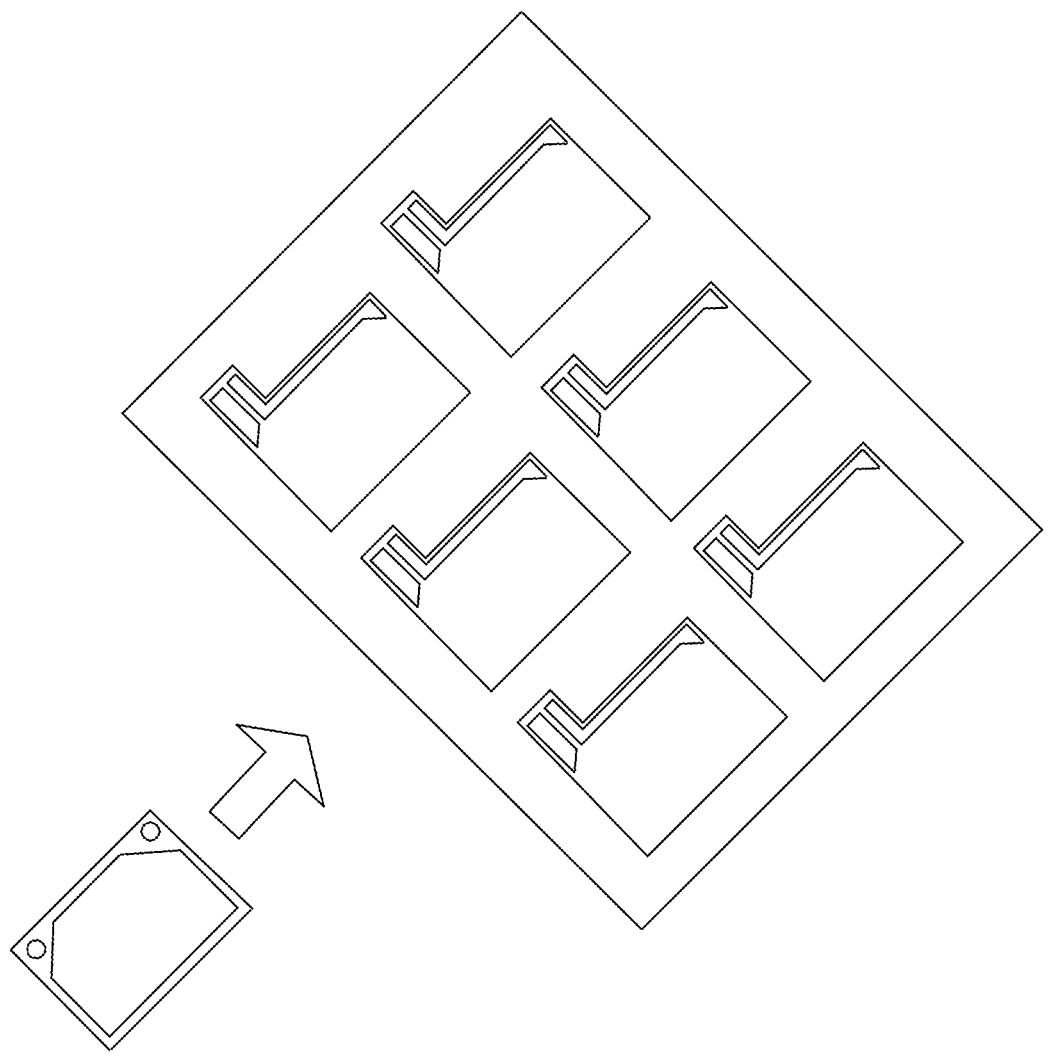

Manufacture of the power unit 100 is now described with reference to FIGS. 2A-2I. Shown in FIG. 2A is the mica substrate 102, with conductive vias 111 formed therein. First, the active battery layers 108 are attached to the mica substrate 102, and the battery contacts 109 are electrically coupled to the conductive vias 111 via conductive glue, as shown in FIG. 2B. Although the mica substrate 102 as shown is sized to receive two active battery layers 108, any size mica substrate 102 that can receive any number of active battery layers 108 may be used. The mica substrate 102 is then cut or separated into separate battery units 100, with each battery unit 100 having an active battery layer 108 thereon, as shown in FIG. 2C.

Each mica substrate 102 is rectangular in shape, but each active battery layer 108 is polygonal shaped such that a triangular area is defined on opposing corners of the mica substrates 102. The conductive vias 111 are positioned within the triangular areas, as are the battery contact pads 109.

The interposer 116 has a plurality of battery substrate receiving portions 112 formed therein, with a set of conductive pads or contacts 117 formed for each battery substrate receiving portion 112, as shown in FIG. 2D. Adhesive is applied by an adhesive dispenser 114 to each battery substrate receiving portion 112, as also shown in FIG. 2D. Thereafter, each battery unit 100 is placed into a respective battery substrate receiving portion 112, as shown in FIG. 2E. It should be noted that during the placing of each battery unit 100 into its respective battery substrate receiving portion 112, each battery unit 100 is not flipped over. That is, during the attachment of the active battery layers 108 on the top side of the mica substrates 102, the bottom side of the mica substrate 102 remains pointing toward the ground.

Figure 2F:
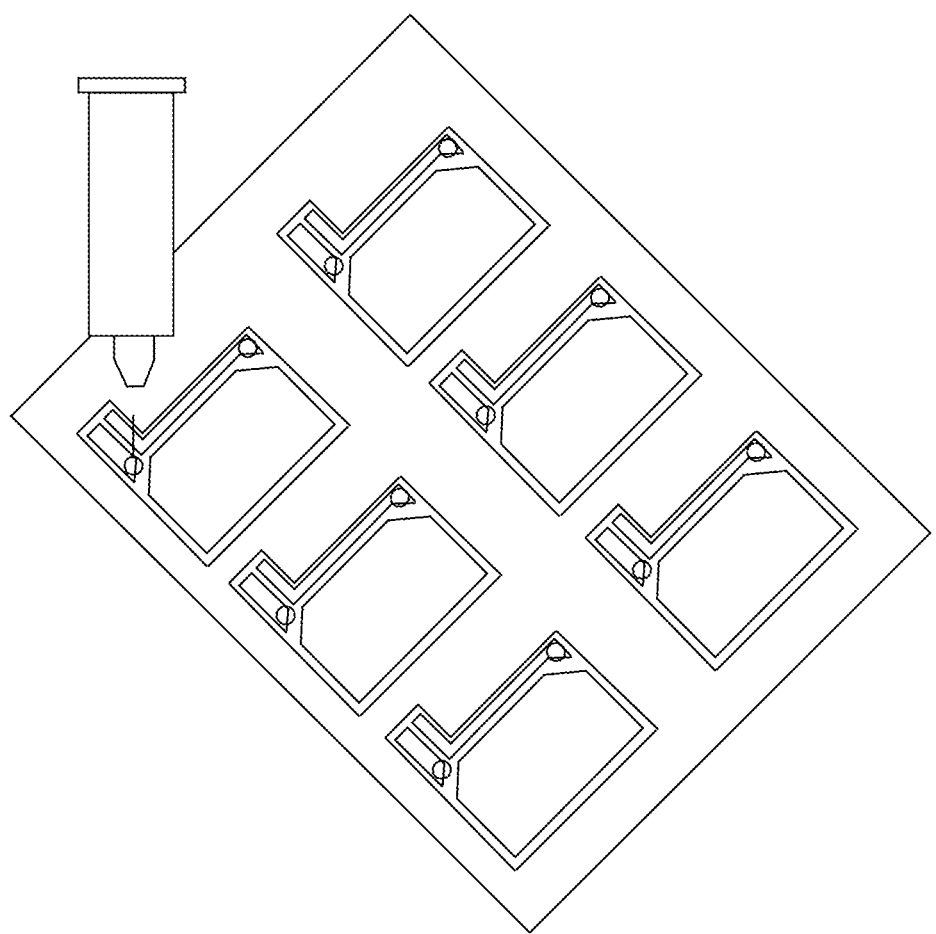
Figure 2G:
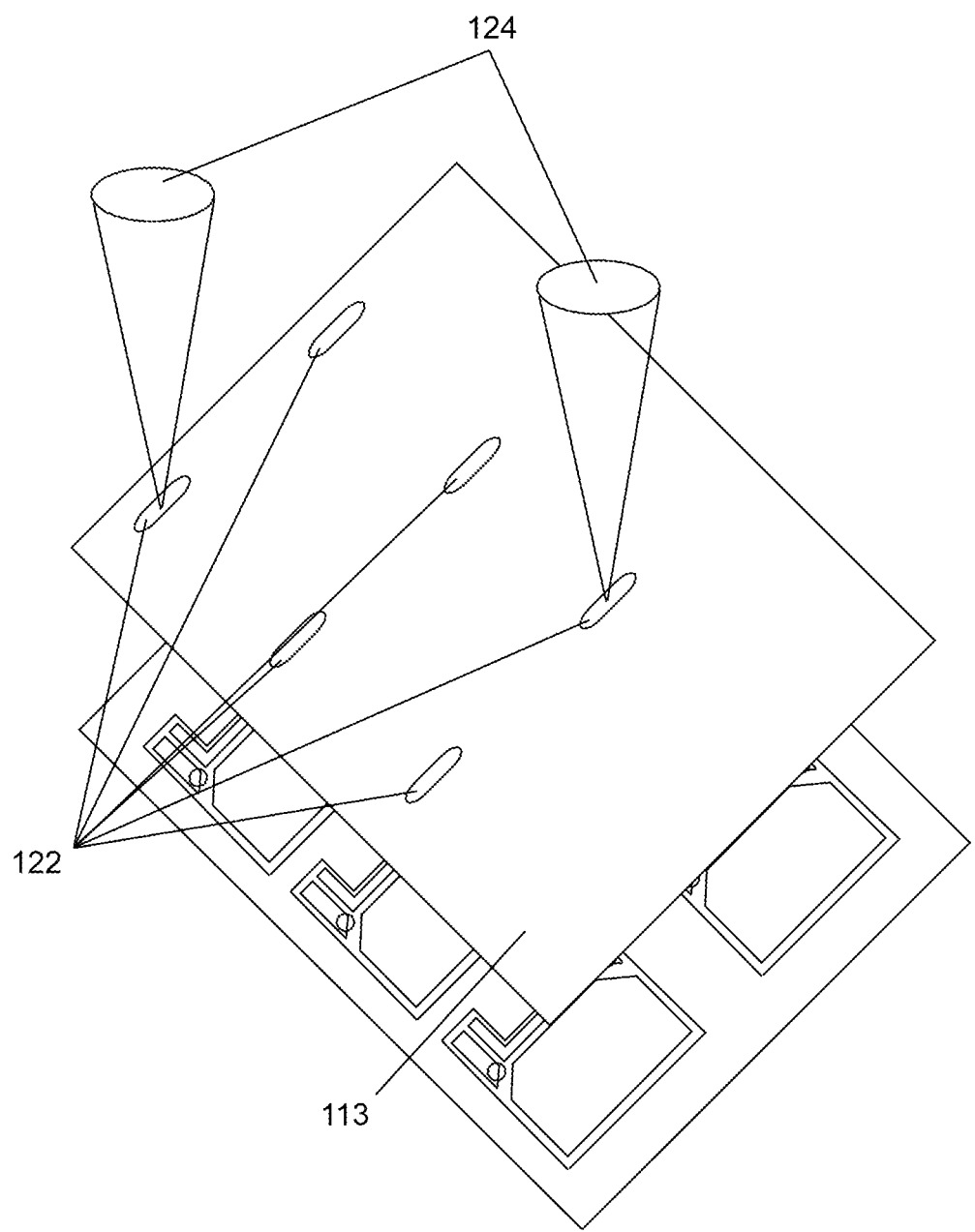
Figure 2H:
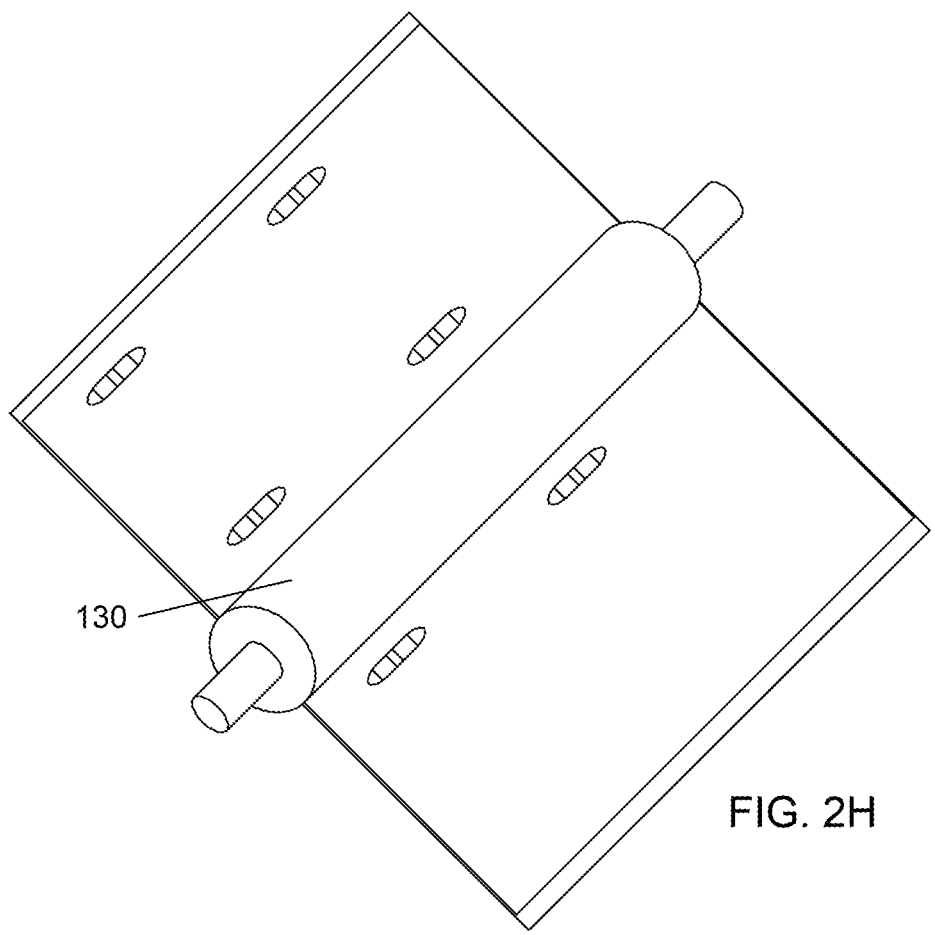
Figure 2I:
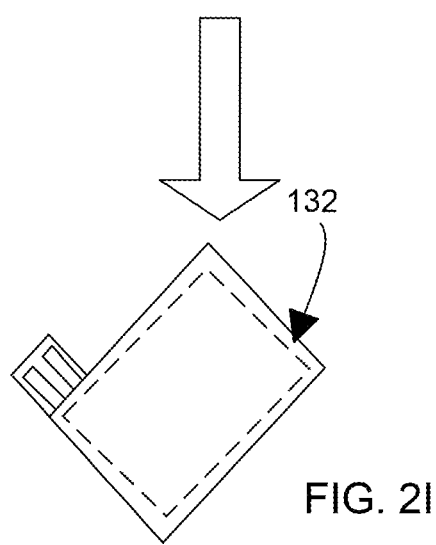

Conductive glue 110 is then applied into the conductive vias 111 so as to electrically couple the battery contact pads 109 to the conductive pads 117, as shown in FIG. 2F. Then, a film 113 is aligned over the interposer 116. The film 113 has holes 122 formed therein that align with the conductive pads 117. Cameras 124 positioned at opposite corners of the film 113 peer through the holes 122 so that the position of the film 113 with respect to the interposer 116 can be fine-tuned, as shown in FIG. 2G. The film 113 is thus aligned and held 1-2 mm above the interposer 116, and a roller 130 is used to laminate the film 113 to the interposer 116, with the conductive glue 110 being positioned within the holes 122. The interposer 116 is then separated via laser singulation into multiple power units 132, with each power unit including an active battery layer 108 thereon.

The process described above for making the battery units 100 eliminates the risk of the aluminum film 113b shorting the conductive pads 117 to the vias 111 or active layer 108 because the aluminum film 113b is insulated from the battery contact pads 109 by the glue 113a.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
   an interposer substrate;
   a plurality of mica substrates disposed on the interposer substrate, each mica substrate having an area smaller than an area of the interposer substrate;
   an active battery layer disposed on each mica substrate, wherein the active battery layer has an area smaller than the area of that mica substrate;
   wherein the interposer substrate has a set of conductive pads for each mica substrate formed thereon; and a film sealing the active battery layers and mica substrates, wherein the film is sized in area such that the film extends beyond each active battery layer to contact each mica substrate and the interposer substrate, the film having a hole defined therein exposing the set of conductive pads for each mica substrate.

2. The electronic device of claim 1, further comprising battery pads on each mica substrate adjacent the active battery layer for that mica substrate; wherein each mica substrate has conductive vias formed therein through the battery pad; and wherein the sets of conductive pads for each mica substrate are respectively coupled to the conductive vias for that mica substrate.

3. The electronic device of claim 2, wherein each mica substrate is rectangular in shape; wherein each active battery layer is polygonal in shape such that a triangular area is defined on a corner of an associated mica substrate by an absence of the active battery layer; and wherein the battery pad for each mica substrate is within the triangular area for that mica substrate.

4. The electronic device of claim 1, wherein the film has holes defined therein exposing the sets of conductive pads.

5. The electronic device of claim 1, wherein the film comprises, in a stacked arrangement, an adhesive layer, and aluminum film layer, and a PET layer.

6. An electronic device, comprising:
an interposer substrate;
a plurality of battery substrates constructed from mica and being attached to the interposer substrate, wherein an aggregate area of the interposer substrate is greater than an aggregate area of the plurality of battery substrates;
a plurality of active battery layers, each active battery layer being attached to a different respective battery substrate, wherein each active battery layer has a smaller area than an area of a corresponding battery substrate; and
a film disposed over the plurality of active battery layers and sized in area such that the film extends beyond each active battery layer to contact each battery substrate, and such that the film extends beyond each battery substrate to contact the interposer substrate.

7. The electronic device of claim 6, further comprising a battery pad on each battery substrate adjacent its respective active battery layer; wherein each battery substrate has a conductive via formed therein through its respective battery pad; and further comprising a plurality of conductive pads formed on the interposer substrate, each conductive pad being electrically coupled to a different one of the conductive vias.

8. The electronic device of claim 7, wherein the film has a plurality of holes defined therein, each hole exposing a different conductive pad.

9. The electronic device of claim 7, wherein each battery substrate is rectangular in shape; wherein each active battery layer is polygonal in shape such that a triangular area is defined on a corner of its respective mica substrate by an absence of the active battery layer; and wherein the battery pad for that battery substrate is within the triangular area.

10. An electronic device, comprising:
an interposer substrate;
a mica substrate on the interposer substrate, wherein a top face of the mica substrate has a surface area smaller than a surface area of a top face of the interposer substrate;
an active battery layer on the mica substrate, wherein a top face of the active battery layer has a surface area smaller than a surface area of a top face of the mica substrate;
a battery pad on the mica substrate adjacent the active battery layer, wherein the mica substrate has a conductive via formed therein which extends to the battery pad;
a conductive pad formed on the interposer substrate and electrically connected to the conductive via;
an adhesive layer over the active battery layer, mica substrate, and interposer substrate;
an aluminum film layer over the adhesive layer; and
an insulating polyethylene terephthalate (PET) layer over the aluminum film layer;
wherein the adhesive layer, aluminum film layer, and PET layer have a hole defined therein exposing the conductive pad.

11. The electronic device of claim 10, wherein the mica substrate is rectangular in shape.

12. The electronic device of claim 10, wherein the active battery layer is polygonal in shape.

13. The electronic device of claim 12, wherein the mica substrate and battery layer are shaped such that an area is defined on a corner thereof by an absence of the active battery layer.

14. The electronic device of claim 10, wherein the adhesive layer, aluminum film layer, and PET layer environmentally seals the active battery layer.

* * * * *